United States Patent [19]

Fisher

[11] 3,895,831

[45] July 22, 1975

[54] SEAL ASSEMBLY PROVIDING DUAL SEAL ZONES
[75] Inventor: Edward Fisher, Buffalo, N.Y.
[73] Assignee: Conax Corporation, Buffalo, N.Y.
[22] Filed: May 10, 1973
[21] Appl. No.: 358,878

[52] U.S. Cl. .................. 285/93; 277/110; 277/117; 285/341; 285/351; 285/356; 285/DIG. 18
[51] Int. Cl. .............................................. F16l 35/00
[58] Field of Search ............ 285/93, 343, 351, 341, 285/DIG. 18, 356; 277/2, 69, 117, 190, 110, 111, 112, 120

[56] References Cited
UNITED STATES PATENTS

| | | | |
|---|---|---|---|
| 1,821,866 | 9/1931 | Wilson | 285/363 X |
| 2,075,947 | 4/1937 | Kennedy | 277/117 X |
| 2,491,598 | 12/1949 | Allen | 285/93 |
| 2,772,100 | 11/1956 | Kreissig et al. | 285/351 X |
| 3,176,996 | 4/1965 | Barnett | 277/2 |

FOREIGN PATENTS OR APPLICATIONS 776,036  5/1957  United Kingdom................. 285/343

*Primary Examiner*—Dave W. Arola
*Attorney, Agent, or Firm*—Sommer & Sommer

[57] ABSTRACT

A seal assembly provides spaced apart seal zones for an object which extends through an opening in a body member to provide a chamber between said zones which may be used to monitor leakage through the seals effected at said zones. An important application is in sealing the passage of a conductor through the containment wall for a nuclear reactor, although the seal assembly is applicable wherever it is desired to provide a seal between an object which penetrates a body member and that can be checked for effectiveness.

10 Claims, 6 Drawing Figures

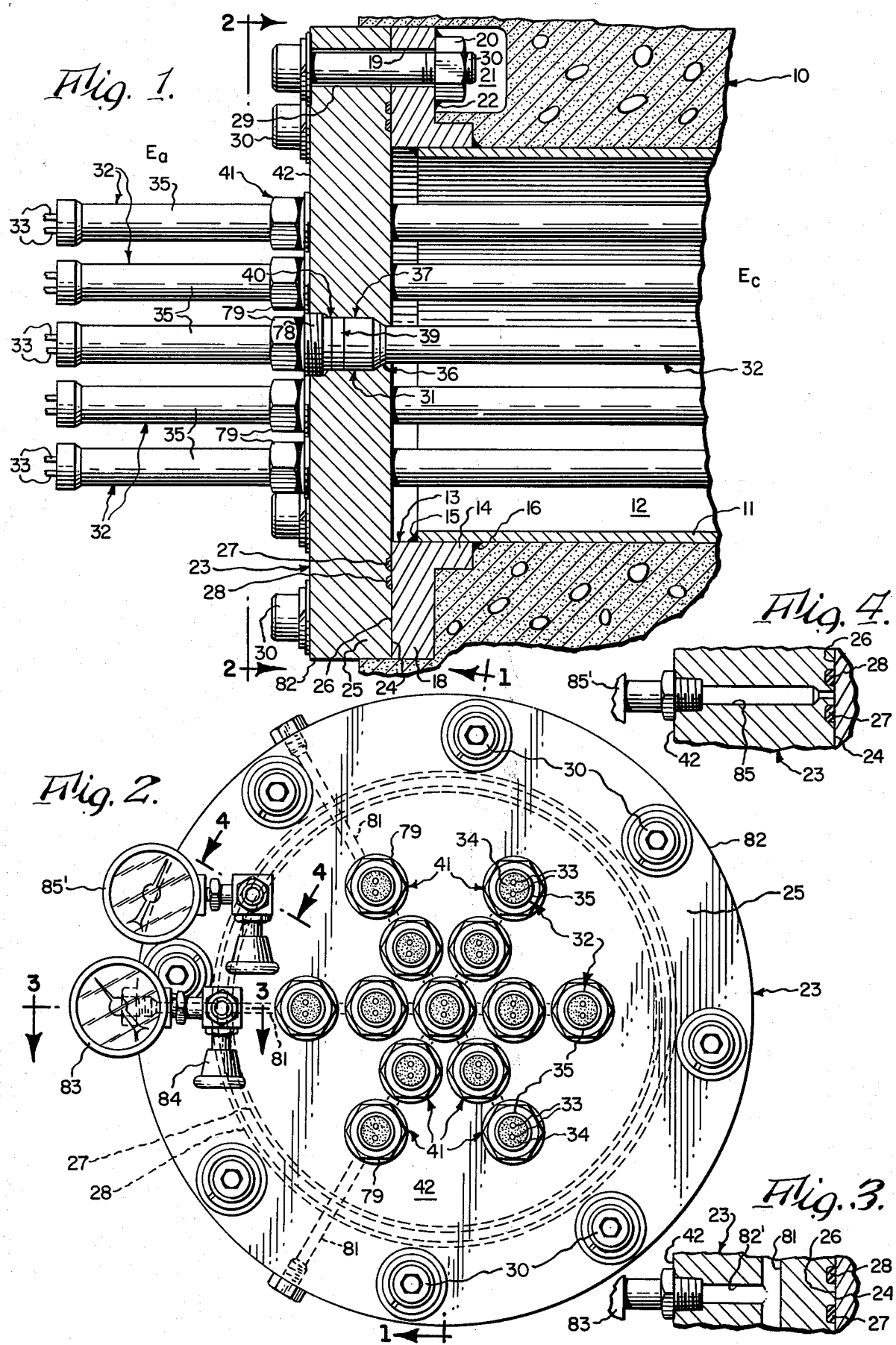

{ 3,895,831 }

SEAL ASSEMBLY PROVIDING DUAL SEAL ZONES

BACKGROUND OF THE INVENTION

1. Field of the Invention

The present invention relates to a seal assembly for mounting an object having a cylindrical periphery which penetrates an opening through a body member.

2. Description of the Prior Art

It is believed that the need for the seal assembly forming the subject of the present invention can best be appreciated by considering the problems associated with passing a penetrant object through the containment wall surrounding a nuclear reactor. Such a wall is usually made of concrete and is several feet thick. It functions to separate an inner contaminated environment from an outer ambient environment. For the operation and control of equipment within the contaminated environment, it is necessary to pass penetrant objects through such wall such as electrical cables, thermocouples, and the like.

A number of factors require consideration in penetrating such a wall. First, an effective seal between the penetrant object and the wall must be provided so as to prevent leakage through the opening in the wall. Second, any seal means for mounting the penetrant object on the wall should be installed, serviced and maintained from the ambient environment side of the wall. Finally, it would be desirable to provide some means for monitoring or testing the integrity of the seal to determine the extent of leakage, if any, therethrough.

Earlier attempts by others to develop such seal structure have not satisfied all of the above desirable design criteria.

Ziegler (U.S. Pat. No. 3,109,055) provided a hermetic seal between a penetrant electrical conductor and the wall. However, Ziegler's structure was not adjustable; nor were any means provided to monitor the integrity of the seal.

Bossu (U.S. Pat. No. 3,104,277) and Peterson (U.S. Pat. No. 3,055,972) severally provided structure for mounting a penetrant object through a wall. In general, these references disclosed structure having a single packing or bushing which was compressively caused to deform into sealing engagement between the wall and the object. Thus, while satisfying two of the above stated criteria, these references did not provide means for monitoring the integrity of the seal.

SUMMARY OF THE INVENTION

The present invention provides a seal assembly which achieves the aforementioned objectives for sealingly mounting an object having a cylindrical periphery which penetrates an opening through a body member. The body member is formed to provide the wall for the opening therethrough with an abutment portion as an annular seat and axially spaced therefrom a cylindrical wall portion. A first ferrule surrounds the object and engages with one part of its periphery and also engages with such seat. A second ferrule surrounds the object and engages with another part of its periphery. A third ferrule surrounds said second ferrule and engages with said cylindrical wall portion. One end of an annular intermediate follower engages said first ferrule and its other end engages said second and third ferrules. Thrust means engage said second and third ferrules and air arranged to apply thereto a force axially directed toward said seat effective to utilize said first ferrule to provide a first sealed engagement between said body member and said object, to utilize said second ferrule to provide a second sealed engagement between said intermediate follower and said object and to utilize said third ferrule to provide a third sealed engagement between said intermediate follower and said body member.

Preferably, the thrust means comprises an annular rear follower surrounding the penetrant object and engaging said second and third ferrules, and a rotatable cap member having a threaded engagement with the body member and engaging said rear follower. Thus, the elements of the seal assembly can be installed from one side of the body member and also adjusted into operative sealing condition by tightening the cap member from the same side.

The intermediate follower may occupy less than the full space between one seal zone provided by the first ferrule and a second seal zone provided by the second and third ferrules to provide a sealed chamber. By communicating such sealed chamber with leak detection means, such as a pressure gauge, for example, the integrity of the seal zones can be monitored.

Accordingly, one object of the present invention is to provide a seal assembly providing dual seal zones for sealingly mounting a penetrant object through a body member.

Another object is to provide such a seal assembly which may be installed from one side of the body member.

Another object is to provide such a seal assembly which may be adjusted, serviced, maintained, removed and replaced, if desired, from such one side of the body member.

Still another object is to provide such a seal assembly having an internal sealed chamber between the spaced apart seal zones by which the integrity of the seals at such seal zones may be monitored.

These and other objects and advantages will become apparent from the foregoing and ongoing specification, the drawings, and the appended claims.

BRIEF DESCRIPTION OF THE DRAWINGS

FIG. 1 is a fragmentary vertical sectional view of a concrete containment wall for a nuclear reactor having an opening in which a tube is arranged including a header or body member having openings through which a plurality of cylindrical penetrant objects severally extend and illustrating a seal assembly for each such penetrant object constructed in accordance with the principles of the present invention.

FIG. 2 is a vertical transverse view thereof taken on line 2—2 of FIG. 1, and showing the outer face of said header in elevation and the penetrant objects in cross section.

FIG. 3 is an enlarged fragmentary horizontal sectional view thereof taken on line 3—3 of FIG. 2, and illustrating interconnected passages in the header utilized for monitoring the seal integrity.

FIG. 4 is an enlarged fragmentary sectional view thereof taken on line 4—4 of FIG. 2, and illustrating a passage in the header utilized for monitoring the integrity of an O-ring seal means for the header mounting.

DESCRIPTION OF THE PREFERRED EMBODIMENT

Figure 5:
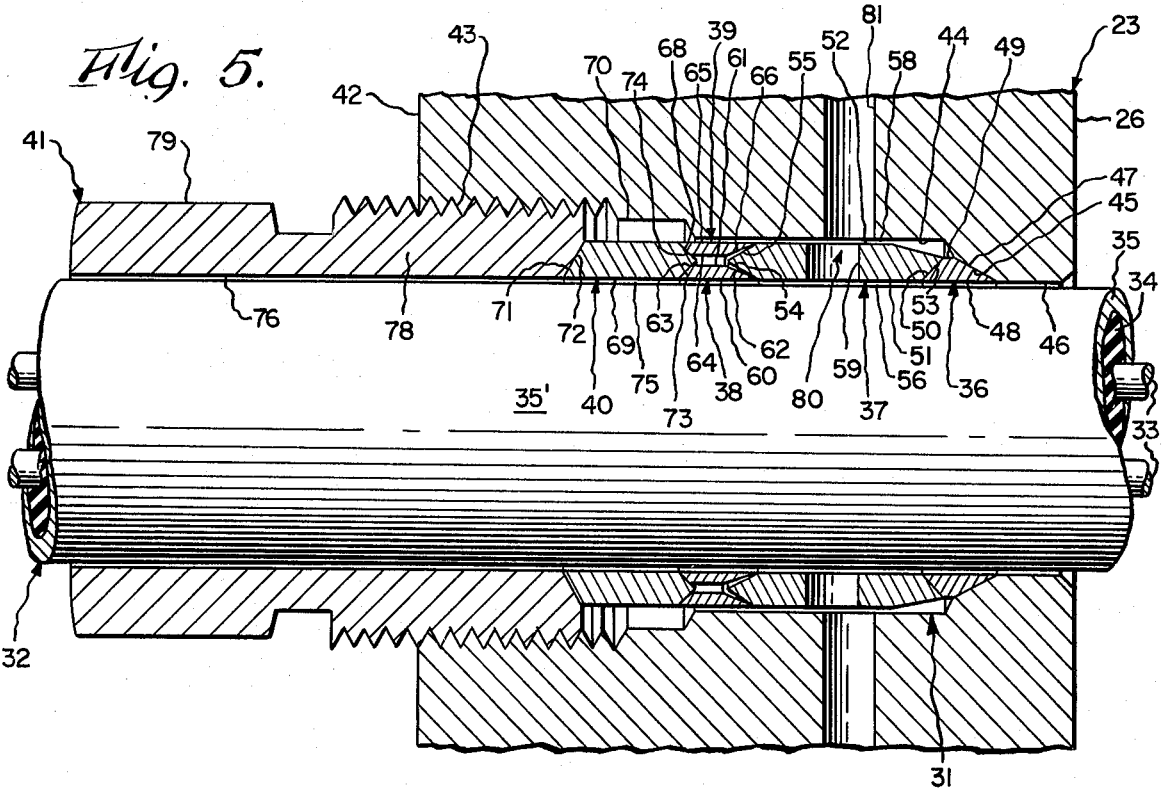
FIG. 5 is a greatly enlarged longitudinal sectional view of the inventive seal assembly for one of the penetrant objects shown in FIG. 1, and illustrating the condition of its elements prior to axial loading.

Referring to FIG. 1, an outer fragmentary section of a concrete containment wall 10 is illustrated as separating a first contained environment $E_c$ on its inner or right side from a second ambient environment $E_a$ on its outer or left side. The particular wall fragment illustrated is an integral portion of the outer wall of a large containment vessel encircling a nuclear reactor to separate a contaminated environment therewithin from an outer ambient environment. However, it should be clearly understood that the present invention is not limited to such specific application, but enjoys general utility to sealingly mount cylindrical objects to penetrate virtually any type of body member or wall. Similarly, the term "environment" is generally employed in its broadest sense as indicating a combination of parameters and conditions, such as volume, pressure, contaminants, and the like.

In FIG. 1, a horizontal metal tube or nozzle 11 is shown embedded in wall 10 to define a cylindrical access opening 12 therethrough communicating the two separated environments $E_c$ and $E_a$. An annular mounting flange member 13 has an L-shaped cross-section with its horizontal axial flange 14 arranged to surround an end portion of the outer surface of tube 11. When so arranged, this flange 14 may be suitably secured to the tube by a pair of circular weldments 15, 16. The outwardly extending vertical radial flange 18 of the mounting flange member 13 is provided with a plurality of circumferentially spaced horizontal through holes 19 arranged in a large diameter bolt circle. A plurality of conventional hex nuts 20 are arranged within wall recesses 21 to be aligned with holes 19 and secured to the interior vertical surface of radial flange 18 by peripheral weldments 22 therearound. In practice, the tube 11 and mounting flange member 13 may be first joined as a subassembly and then suitably mounted in place in the concrete containment wall 10.

A header 23 in the form of a circular metal plate is vertically arranged against flange member 13 so that the right or inner flat surface 24 of the marginal portion 25 of this plate abuts the outer or left vertical flat surface 26 of radial flange 18. A pair of concentric radially spaced inner and outer O-rings 27, 28 are arranged in circular grooves provided in header surface 24 and sealingly engage flange surface 26 to seal the header to the flange, thereby closing the access opening 12. The header is provided with a plurality of circumferentially spaced horizontal through holes 29 arranged in a bolt circle and severally aligned with holes 19 in axial flange 18. A plurality of bolts 30 may be passed rightward through the aligned holes 29, 19 to threadedly engage nuts 20 for securely fastening the header to the mounting flange.

As best shown in FIGS. 1 and 2, the central portion of header 23 is provided with thirteen horizontal through openings 31. These openings are spaced from one another and arranged along lines of five each, such lines intersecting with one another at included angles of 60° and having their common center opening positioned at the mutual intersection of the lines. Thus, this spacing provides two concentric circles of six circumferentially spaced openings each encircling the common center opening.

Figure 6:
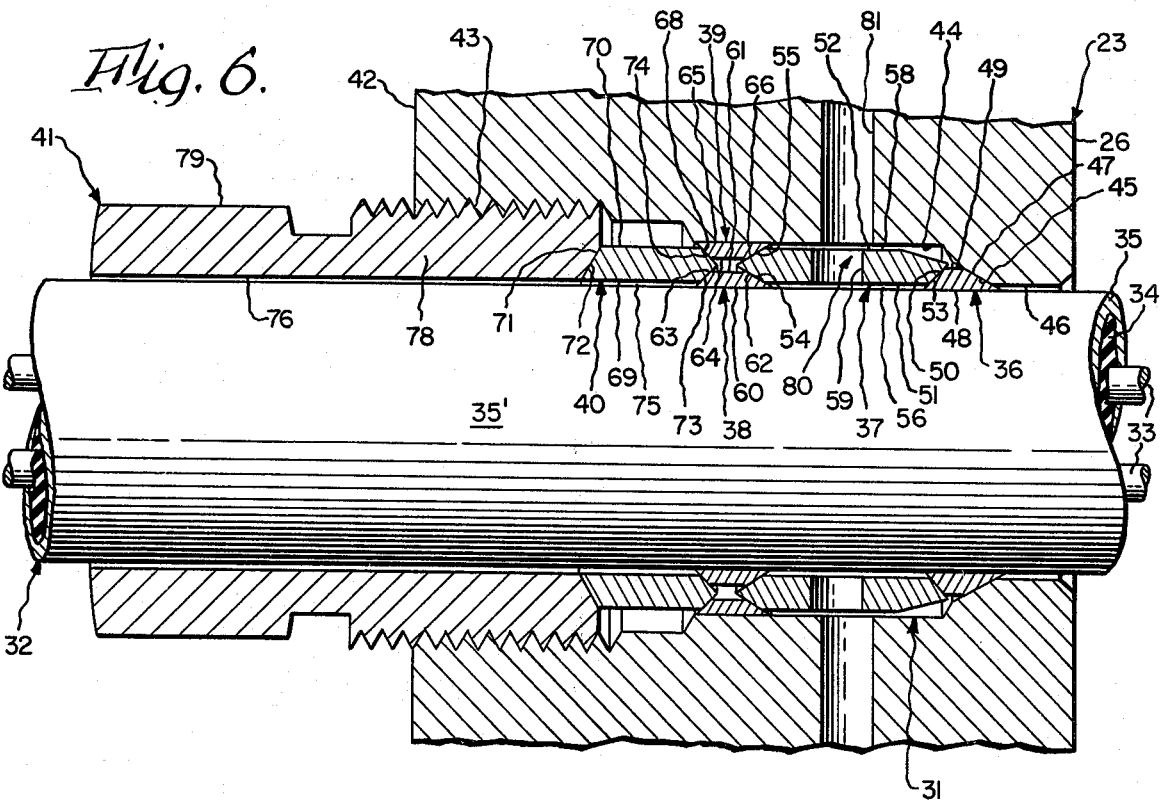
FIG. 6 is a view similar to FIG. 5, but illustrating the condition of the elements of the seal assembly after being subjected to axial loading to provide two effective axially spaced apart seal zones.

A penetrant object 32 is arranged to extend through each of openings 31 to penetrate the header. Thus, objects 32 pass from within the contaminated environment $E_c$, through the openings 31, and extend leftward into the ambient environment $E_a$. These objects 32 are shown to be electrical cables, each having a pair of spaced conductors 33 embedded in a core of dielectric insulating material 34, and surrounded by a cylindrical tube-like metal outer sheath 35 having a cylindrical periphery 35' (FIGS. 5 and 6). It should be clearly understood that the term "cylindrical object" as used herein is not limited to electrical cables, but also includes other penetrant objects having a cylindrical periphery, such as thermocouples and the like.

In FIGS. 5 and 6, the structure of the inventive seal assembly is more clearly shown as generally comprising the header 23 as a body member, a lead or first ferrule 36, an intermediate follower 37, a rear ferrule assembly including an inner or second ferrule 38 and an outer or third ferrule 39, and thrust means including a rear follower 40 and a compression cap 41.

The opening 31 is shown in FIGS. 5 and 6 as extending through the header 23 from its left surface 42 to its right surface 26 to communicate the two separated environments $E_c$ and $E_a$. Each such opening 31 is defined by an annular wall formed by machining header 23 so as to have an internally threaded portion 43 extending inward from its left end which steps down to an intermediate cylindrical portion 44 of smaller diameter and then becomes an annular frusto-concial abutment portion 45 which finally joins with a cylindrical portion 46 of reduced diameter adjacent its right end. This abutment wall portion 45 is shown as divergently inclined in a leftward direction toward ferrule 36. The wall of opening 31 surrounds a portion of the periphery 35' of cylindrical object 32 which passes therethrough. Interposed between this wall and periphery are the ferrules 36, 38 and 39, followers 37 and 40 and the externally threaded neck portion of compression cap 41.

The lead ferrule 36 is shown arranged within opening 31 opposite flared abutment portion 45 and has inclined annular surface 47 adapted to seat on this abutment portion. This lead ferrule is shown as having a trapezoidal cross-section including a long inner cylindrical surface 48, and a short outer cylindrical surface 49. These surfaces at one end are connected by inclined surface 47 and at their other end adjacent intermediate follower 37 by an annular surface 50 convergently inclined in a direction toward such follower. Opposing cylindrical surfaces 48 and 35' are adapted to engage each other.

This follower 37 is annular in form, having inner and outer cylindrical surfaces 51 and 52, respectively. At the end adjacent ferrule 36, follower 37 has an annular surface 53 divergently inclined toward ferrule 36 and engageable with inclined surface 50 thereof. At its opposite end, follower 37 has inner and outer inclined annular surfaces 54 and 55, respectively. Inner surface 54 inclines divergently in a direction toward inner ferrule 38 and outer surface 55 inclines convergently in a direction toward outer ferrule 39. At all times, an inner radial spacing exists between opposing surfaces 35' and 51 to provide an annular clearance 56, and an outer radial spacing exists between opposing surfaces 44 and 52 to provide an annular clearance 58. Follower 37 has one or more circumferentially spaced holes 59 which establish communication between clearances 56 and 58 for a purpose explained later herein.

Inner ferrule 38 has a trapezoidal configuration in cross-section, including a long inner cylindrical surface 60, a short outer cylindrical surface 61, an annular end surface 62 inclined convergently toward intermediate follower 37 and adapted to engage surface 54 thereof, and an annular surface 63 at its opposite end convergently inclined in a direction toward rear follower 40. Outer ferrule 39 has a trapezoidal configuration in cross-section, including a short inner cylindrical surface 64, a long outer cylindrical surface 65, an annular end surface 66 inclined divergently in a direction toward intermediate follower 37 and adapted to engage surface 55 thereof, and an annular surface 68 at its opposite end divergently inclined in a direction toward rear follower 40. Opposing cylindrical surfaces 60 and 35' are adapted to engage each other. Opposing cylindrical surfaces 65 and 44 are adapted to engage each other.

Rear follower 40 is shown as having inner and outer cylindrical surfaces 69 and 70, respectively, joined at one end by an annular surface 71 inclined convergently in a direction toward compression cap 41 and adapted to engage an annular inclined surface 72 thereon. At its opposite end, rear follower 40 has inner and outer inclined annular end surfaces 73 and 74, respectively. Inner surface 73 inclines divergently in a direction toward inner ferrule 38 and is engageable with surface 63 thereof. Outer surface 74 inclines convergently in a direction toward outer ferrule 39 and is engageable with surface 68 thereof. The inner cylindrical surface 69 of rear follower 40 is shown as being radially spaced from periphery 35' of the cylindrical object to provide an annular clearance 75 therebetween.

Compression cap 41 is shown as tubular in general forming having a cylindrical through bore 76 through which object 32 extends so as to be in slightly radially spaced relation to its periphery 35'. This cap includes a neck portion 78 externally threaded to engage the internally threaded portion 43 of opening 31. At its exposed end, cap 41 has an out-of-round head 79, preferably polygonal in shape to permit the application of a suitable tool such as a wrench (not shown) for tightening or loosening the cap.

The seal assembly may be loosely assembled as illustrated in FIG. 5 to encircle a portion of the cylindrical object 35 which is to be sealingly mounted through the header 23. Thereafter, compression cap 41 is rotatively tightened to axially displace or urge the ferrules and follwers rightward toward the seat 45. The followers 38, 40 serve to transmit axial force and motion from the compression cap 41 to the spaced ferrules.

When compression cap 41 is suitably tightened, the lead ferrule 36 will be radially compressed as its forward surface 47 is displaced rightward relative to the inclined seat 45. This radial contraction of the lead ferrule forces its inner surface 48 to move into sealing engagement with the surrounded part of periphery 35' of the object immediately therebeneath. Thus, the lead ferrule 36 provides a lead or forward seal between the lead portion of the object and the seat.

When compression cap 41 is tightened, the facing noses on followers 37 and 40 provided by inclined surfaces 54, 55 and 73, 74 are urged toward one another to enter the space between the opposing cylindrical surfaces 61, 64 of inner and outer ferrules 38, 39, respectively, from opposite ends thereof. The inclined surfaces 62, 66 and 63, 68 engaging these noses act to force the inner cylindrical surface 60 of inner ferrule 38 radially inwardly into sealing engagement with an opposing portion of the object's periphery 35' and to force the outer cylindrical surface 65 of the outer ferrule 39 radially outwardly into sealingly engagement with an opposing part of the cylindrical wall portion 4. Thus, the rear ferrules 38 and 39 may be moved into sealing engagement between the followers, the object, and the opening wall.

When compression cap 41 is tightened, its end surface 72 wipingly engages the complementary end surface 71 on rear follower 40. This follower is desired to take the relative rotation between these surfaces 71 and 72 so that the follower is non-rotative and exerts only an axial thrust on ferrules 38 and 39.

The thrust means constituted by compression cap 41 and rear follower 40 applies to ferrules 38 and 39 a force axially directed toward seat 45 effective to utilize lead ferrule 36 to provide a first sealed engagement between header 23 and penetrant object 32, to utilize inner ferrule 38 to provide a second sealed engagement between intermediate follower 37 and said object and to utilize outer ferrule 39 to provide a third sealed engagement between said intermediate follower and said header.

In the practice of my invention, I presently prefer to form the header 23, the followers 37 and 40, and the compression cap 41 of stainless steel because of its strength and its resistance to other environmental adversities. The ferrules 36, 38 and 39 are preferably formed of hard copper, subsequently softened by annealing for one hour to an elevated temperature of 700°–750°F, and thereafter provided with an outer coating of a deformable material, such as silver, having a thickness of 1–2 mils. This silver coating on the ferrules tends to resist oxidation and is more easily deformed to the contour of the various bearing surfaces to further insure the integrity of the resultant seals. I also prefer to lubricate the various bearing surfaces to reduce the frictional resistance to movement between contacting bearing surfaces.

The present invention thus provides two axially spaced seal zones, leaving therebetween an intermediate chamber 80 constituted by the clearances 56, 58 and holes 59. To monitor the integrity of these seals, three passages 81 severally extend radially inward from the outer peripheral surface 82 of the header to intersect the chambers 80 of each of the five lineal openings 31 between their axially spaced seal zones (FIGS. 2, 5, and 6).

As best shown in FIG. 3, a horizontal passage 82' may extend inward from the left face 42 of the header to communicate with one of the interconnected passages 81. Leak detection means, such as a pressure gauge 83, may be suitably mounted on the header to sense or detect an increase or decrease of pressure within the manifolded chambers 80. For example, these manifolded sealed chambers 80 may be pressurized with a test gas such as helium through an inlet 84, which pressure may then be observed or monitored on the dial of the pressure gauge 83. A subsequent variation in this pressure would indicate a leak through at least one of the seals, theeby calling attention to the need for service.

When the manifolded chambers 80 have been pressurized with helium as a test gas, I have observed that the seal integrity may be on the order of $10^{-9}$ standard cc of helium/second, corrected to standard conditions of temperature (25°C) and pressure (760 mm of Hg).

As best shown in FIGS. 2 and 4, I may additionally provide a horizontal passage 85 through the header to communicate with the interfacial space sealed by O-rings 27, 28. This passage may be closed by another pressure gauge 85' by which the integrity of the O-ring seals may be continuously monitored.

One unique and highly desirable feature of the invention resides in the capability of inserting or removing the seal assembly from one side of the header. Should a leak develop, an operator may further tighten the compression cap in the ambient environment without disassembly of the apparatus.

While a preferred embodiment of the invention has been shown and described, it will be understood that various changes and modifications may be made without departing from the sprit of the invention which is defined by the following claims.

What is claimed is:

1. A seal assembly comprising an object having a cylindrical periphery which penetrates an opening through a body member,
   means providing an abutment portion of the wall of said opening as an annular seat;
   means providing a cylindrical portion of said wall spaced axially from such abutment wall portion;
   a first metal ferrule surrounding said object and engaged with said seat and one part of said periphery;
   a second metal ferrule surrounding said object and engaged with another part of said periphery;
   a third metal ferrule surrounding said second ferrule and engaged with such cylindrical wall portion;
   an annular intermediate follower engaged at one end with said first ferrule and engaged at its other end with said second and third ferrules; and
   thrust means engaged with said second and third ferrules applying thereto a force axially directed toward said seat effective to utilize said first ferrule to provide a first sealed engagement between said body member and said object, to utilize said second ferrule to provide a second sealed engagement between said intermediate follower and said object and to utilize said third ferrule to provide a third sealed engagement between said intermediate follower and said body member.

2. A seal assembly according to claim 1 wherein said thrust means includes an annular rear follower surrounding said object and engaged with said second and third ferrules, and a rotatable cap member having a threaded engagement with said body member and engaged with said rear follower.

3. A seal assembly according to claim 1 wherein said intermediate follower occupies less than all of the space defined by said periphery intermediate its said parts and the portion of said wall between its said abutment and cylindrical wall portions to provide a chamber having two sealed ends, and said body member has an access opening terminating in said wall and communicating with said chamber.

4. A seal assembly according to claim 3 wherein said intermediate follower has inner clearance with such intermediate peripheral part, has outer clearance with such intermediate wall portion, and also has at least one hole therethrough establishing communication between said clearances.

5. A seal assembly according to claim 1 wherein said seat is divergently inclined in a direction toward said first ferrule, an inclined annular first surface is on said first ferrule engaged with such inclined seat, an annular second surface is on said first ferrule convergently inclined in a direction toward said intermediate follower, an inclined annular third surface is on said intermediate fllower engaged with said second surface, an annular fourth surface is on said second ferrule convergently inclined in a direction toward said intermediate follower, an inclined annular fifth surface is on said intermediate follower engaged with said fourth surface, a sixth annular surface is on said third ferrule divergently inclined in a direction toward said intermediate follower, and an inclined annular seventh surface is on said intermediate follower engaged with said sixth surface.

6. A seal assembly according to claim 5 wherein said thrust means includes an annular rear follower surrounding said object and having an annular eighth surface divergently inclined in a direction toward said second ferrule and also having an annular ninth surface convergently inclined in a direction toward said third ferrule, and said second and third ferrules have inclined annular tenth and eleventh surfaces, respectively, engaged with said eighth and ninth surfaces, respectively.

7. A seal assembly according to claim 6 wherein each of said ferrules is a continuous ring.

8. A seal assembly according to claim 7 wherein each of said ferrules is composed of a material more malleable than that of which said body member and followers are composed.

9. A seal assembly according to claim 8 wherein each of said ferrules is composed of copper coated with silver and said body member and followers are composed of stainless steel.

10. A seal assembly according to claim 4 wherein said body member is provided with a passage communicating with said chamber and further comprising detection means operatively associated with said passage for sensing the integrity of said sealed engagements.

* * * * *